Patented Jan. 21, 1930

1,744,581

UNITED STATES PATENT OFFICE.

JOSEPH SCHNEIBLE, OF CHICAGO, ILLINOIS; BEATRICE SCHNEIBLE INGRAM, ADMINISTRATRIX OF SAID JOSEPH SCHNEIBLE, DECEASED, ASSIGNOR, BY MESNE ASSIGNMENTS, TO CLAUDE B. SCHNEIBLE, OF LOS ANGELES, CALIFORNIA, AND KONRAD F. SCHREIER, OF HIGHLAND PARK, ILLINOIS

WHOLE-GRAIN FLOUR AND THE LIKE

No Drawing. Application filed December 7, 1923. Serial No. 679,197.

This invention relates to improvements in the manufacture of whole grain meal or flour and the product thereof, said meal or flour being particularly suitable for the manufacture of bread, biscuit, cake, etc, and being highly stable in commercial handling.

In carrying out the invention, any suitable cereal grain may be employed, wheat and rye being preferred. The grain is washed, and is then caused to germinate under controlled conditions, particularly as regards temperature, moisture and circulation of air. In the germinating process a suitable amount of water is added, either at the beginning of the process or at intervals therein, the amount of water added being preferably such as not to cause the total moisture content to exceed 35% at any time during the germination. Any temperature suitable for germination may be employed, the temperature being, however, preferably maintained between 70 and 85° F.

The germinating process is carried to a sufficient point to form within the grain an appreciable quantity of maltose in addition to the sugars normally present in the grains and is not permitted to reach the point at which the amylase formed in the grains will be capable of converting to sugars all the starch present therein during the process of manufacture of bread, etc., from the flour or meal produced say in 6 hours. For example, in the case of wheat, the germination may be carried on, under the preferred conditions above set forth, for from 24 to 48 hours, thereby attaining a state of germination intermediate the limiting conditions hereinbefore set forth, the condition of the grain being recognizable by the growth of the rootlet and the lack of substantial development of the acrospire as the proper point for halting the process, the development of maltose (as quantitatively determined) being controlled in accordance with the flavor desired in the product. During the germinating process the grain is aerated and, if necessary, moistened by sprinkling or by other suitable means.

After the germinating process is complete, the grain, having a moisture content not exceeding 35%, is dried. To avoid injury to the enzymes of the grain, the drying is carried out at a temperature of not over about 120° F. until the moisture content reaches 15%, after which it may be slowly raised to any desired temperature up to 220° F. for completion of the process. The drying is continued until the cellulosic portions of the grain become friable, this being accomplished when the moisture content is reduced to about 6% or less. The temperature employed in the later stage of the drying materially affects the flavor of the product, more highly flavored products being formed as a result of the use of higher temperatures up to 220° F. Preferably temperatures of 165 to 170° F. are employed. In the later stage of the drying the eggs and larvæ of insects which may be present and molds which may develop during the germination process are destroyed and mold spores greatly weakened, thereby giving the flour produced and the products made therefrom a very greatly increased commercial stability and obviating the chief source of deterioration of whole grain flours hitherto known.

The dried germinated grain is then ground as a whole to any desired degree of fineness, the resulting flour being employed in the manufacture of breads, biscuits, cakes and other products.

I claim:

1. A whole grain flour, free from molds and the like and comprising the cellulosic constituents of the grain in friable form as modified by heating to a temperature of 160° F. to 200° F., and the remaining constituents of the whole grain modified by controlled germination to contain detectable quantities of maltose in addition to the sugars of the grain and insufficient diastase to effect conversion of the starch of the grain during the bread making process.

2. A whole grain flour containing the constituents of the whole grain modified by controlled germination to contain detectable quantities of maltose in addition to the sugars of the grain and insufficient diastase to effect conversion of the starch of the grain during the bread making process.

3. A whole wheat flour, free from molds and the like and comprising the cellulosic constituents of the grain in friable form as modified by heating to a temperature of 160° F. to 200° F., and the remaining constituents of the whole wheat grain modified by controlled germination to contain detectable quantities of maltose in addition to the sugars of the grain and insufficient amylase to effect conversion of the starch of the wheat during the bread making process.

4. The method of producing a whole grain flour which comprises germinating the grain to the formation of a detectable quantity of maltose in addition to the sugar present in the grain, the germination being halted before the amylase formed is sufficient to effect conversion of all the starch of the grain during the bread making process, drying the germinated grain at a temperature of not over 200° F. to a moisture content not over 6%, whereby the cellulosic parts of the grain are rendered friable and the product stabilized, and grinding the grains.

5. The method of producing a whole grain flour which comprises germinating the grain in the presence of moisture not exceeding 35% at one time to the formation of a detectable quantity of maltose in addition to the sugar present in the grain, the germination being halted before the amylase formed is sufficient to effect conversion of all the starch of the grain during the bread making process, drying the germinated grain at a temperature of not over 220° F. to a moisture content not over 6%, whereby the cellulosic parts of the grain are rendered friable and the product stabilized, and grinding the grains.

6. The method of producing a whole wheat flour which consists in germinating wheat in the presence of moisture not exceeding 35% at any time, to the formation of a desired amount of maltose, the germination being halted before the diastase formed is sufficient to effect conversion of all of the starch during the bread making process, drying the grain at a temperature not over 120° F. to a moisture content of not over 15% and continuing the drying at a temperature up to 220° F. to not over 6% moisture, thereby rendering friable the cellulosic parts of the grain and stabilizing it towards parasites, and grinding the grain.

JOSEPH SCHNEIBLE.